United States Patent Office 3,394,119
Patented July 23, 1968

3,394,119
PROTEINACEOUS SURFACE-ACTIVE AGENTS PREPARED BY REACTING A PROTEIN WITH THE REACTION PRODUCT OF A FATTY ESTER OR ETHER WITH A HALOGENATED EPOXY
Stewart B. Luce, La Grange, and Harland H. Young, Western Springs, Ill., assignors to Swift & Company, Chicago, Ill., a corporation of Illinois
No Drawing. Continuation-in-part of application Ser. No. 180,345, Mar. 16, 1962. This application June 9, 1966, Ser. No. 556,288
The portion of the term of the patent subsequent to Apr. 18, 1984, has been disclaimed
8 Claims. (Cl. 260—112)

This application is a continuation in part of our copending application Ser. No. 180,345 filed Mar. 16, 1962.

This invention relates to derivatives of protein materials and to methods of making these derivatives. More particularly, the invention relates to novel surface-active proteinaceous materials and to a process for their production.

It is known that surface-active protein derivatives may be obtained by splitting protein substances and reacting the peptide-like decomposition products thus obtained with acid chlorides of higher saturated or unsaturated aliphatic carboxylic or sulfonic acids. A serious hindrance to the large scale use of this method is the cost of preparing the acid chlorides.

Other problems involved in the acyl chloride method are discussed in the patents to Sommer, No. 2,015,912 and No. 2,151,241, and the patent to Keil, No. 2,728,759. These problems include the incompleteness of the reaction and the tendency to form troublesome side reaction products. The above-cited patents show that there is a continuing need for a simple method for producing proteinaceous surface-active agents from inexpensive reagents.

Therefore, it is an object of this invention to provide novel surface-active protein derivatives.

Another object of this invention is the provision of an improved process for production of surface-active protein derivatives.

A further object of the invention is to provide a new method of producing surface-active protein derivatives.

Generally, the invention is concerned with the treatment of proteins and hydrolytic degradation products of proteins to form novel surface-active agents. The compounds of the present invention may be varied according to the method of the present invention to have prolific sudsing and detergent properties, defoaming properties, or variations therebetween.

More specifically, the modified proteins of this invention are prepared by the treatment of an alkaline aqueous solution of protein with modifying agents, specific halogenated esters and ethers of carboxylic acids, to cause condensation with the protein. Such a reaction using for example a carboxylic ester of glycerol monochlorohydrin and an aqueous alkaline solution of protein is as follows:

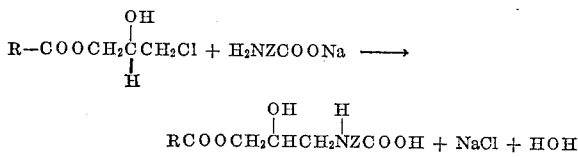

wherein $H_2NZCOONa$ is the proteinaceous material.

The modified protein still having a hydrogen attached to the nitrogen would be expected to be reactive with excess glycerol chlorohydrin ester. Also, the amide groups of peptides have available hydrogen which would also be reactive at this position, as would the active hydrogens normally present in proteinaceous materials as part of hydroxyl or mercapto groups. Consequently, it is not desired to limit the invention to a substitution theory involving attachment of the modifying agents at particular reactive hydrogen sites as it has been observed that under the conditions set forth there is a definite improvement in the surface activity of the modified proteins without regard to the particular mechanism involved in the reaction.

Protein materials with which the halogenated modifying agents couple include all those which can be placed in an alkaline aqueous dispersion. The proteins can be of either animal or vegetable origin and include simple and conjugated proteins. Included among the vegetable proteins are soybean, zein, cottonseed, peanut and casein of the alkaline soluble group, as well as their seed meals and hydrolysis products.

Proteinaceous residues such as seed meals from which the oils have been extracted may be heated in alkaline solution to release protein hydrolytes and some hydrolyzed carbohydrate. These mixtures of proteinaceous and carbohydrate material may react in much the same way as carboxymethyl derivatives are prepared from carbohydrates.

A second group of usable proteinaceous materials includes the keratins, from sources including hoof, horn, and feathers. A third group comprises collagen, glue, gelatin and their hydrolysis products such as stick. All protein materials or their derivatives are included whether native, denatured or degraded by hydrolysis. Also, peptides whether natural or synthetic, are included in the terms "protein" and "proteinaceous material."

Preferably the protein is in a hydrolyzed state so as to provide a protein residue having a molecular weight between 500 and 5000. This however is not limiting and for certain products it is desirable to use proteinaceous material above or below these molecular weights.

As stated above, the present invention relates to products produced by the reaction of proteinaceous material with halogenated modifying agents. These agents are prepared by reacting a fatty acid or alcohol containing about 8–22 carbon atoms with a halogenated epoxy compound to obtain a halogenated ester or ether. For example, the lauroyl ester of glycerol monochlorohydrin is produced by reacting lauric acid with epichlorohydrin in the presence of an amine such as triethylamine or pyridine. The esters may be produced by the method taught by Stein in U.S. Patent No. 2,335,813. The ethers may be produced using similar reaction conditions. Suitable fatty acids include the commonly available technical fatty acid mixtures which are obtained from fats of animal or plant origin. For example coconut oil fatty acids, tallow oil fatty acids, tall oil, red oil, and even highly unsaturated acids such as those obtained from linseed, tung, and safflower oils are usable in the invention. The useful fatty alcohols may be derived by reducing the above-described fatty acids.

The halogenated epoxy compounds used in forming the modifying agents are of the formula:

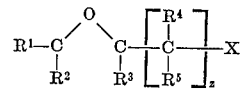

wherein X is chlorine, fluorine, bromine, or iodine; z is an integer of from 1–10, and $R^1$, $R^2$, $R^3$, $R^4$, and $R^5$ are hydrogen or alkyl radicals of from 1–8 carbon atoms. However, z is usually less than 5 and the alkyl radicals preferably contain 1 or 2 carbon atoms. Specific examples include epichlorohydrin, epibromohydrin, epifluorohydrin, epiiodohydrin, 1-bromo 3,4-epoxy butane, 1-chloro 2,3-epoxy octane, and 1-chloro 3,4-epoxy hexane.

As an example of the preparation of the modifying agents, the monoester or monoether of glycerol monohalohydrin may be prepared by refluxing one mole of the fatty acid or fatty alcohol with one or more moles of epihalohydrin. From 1 to 5% triethylamine or other tertiary amine may be used as a catalyst based upon the weight of epihalohydrin. Tetraalkyl ammonium salts such as tetra methyl ammonium bromide are effective catalysts for the reaction at lower concentrations, 0.2–1.0% basis weight of fatty acid. There are three forms of glycerol halohydrine esters:

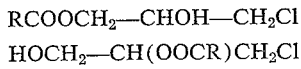

and

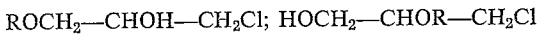

wherein R is the fatty chain of the carboxylic acid. Similarly the ethers may exist in three forms:

$ROCH_2—CHOH—CH_2Cl$; $HOCH_2—CHOR—CH_2Cl$ and

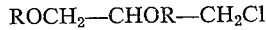

The halogen groups of the halohydrin esters or ethers react readily with active hydrogens normally present in proteinaceous materials as part of hydroxyl, amino or mercapto groups. The final reaction product is a higher fatty ester or ether of a proteinaceous material which is characterized by having substituted therein carboxylic acid esters or ethers of halohydrins. The reaction, unlike the reaction of epichlorohydrin and other epoxy halides with proteinaceous material, does not proceed to an insoluble gel. The inventive reaction proceeds no further than the attachment of a mono or diglyceride moiety to the protein or protein fragment.

In the practice of the present invention, balancing the hydrophilic and lipophylic portions of the resulting surfactant molecule may be easily accomplished. The lipophylic portion of the surface-active agent may be varied by selection of the epoxy halide and carboxylic acid to provide the desired chain length or carbon skeleton. There is no reactivity problem using the modifying agents in alkaline aqueous solutions.

The protein portion of a surface-active agent may be varied in size by degrading the protein through controlled hydrolysis. Some proteins such as casein or soy protein have very high molecular weights and a limited number of amino, mercapto, or hydroxyl groups with which to condense halohydrin esters. The resulting product of a large protein moiety with a relatively smaller lipophylic group, although surface-active, is not a suds-producing product. Instead it forms emulsions readily, but has no particular tendency to foam and may have defoaming properties. If however the protein is degraded until its relative molecular size is roughly 8 to 10 times that of the fatty acid radical, then the product will have prolific sudsing and detergent properties. Thus weight proportions of modifying agent and proteinaceous material varies widely depending upon the type of surface-active agent desired.

It is frequently desirable and preferred to determine the available reactive hydrogen atoms in the protein and then use approximately stoichiometric quantities of the modifying agent. A small excess, about 10%, of the modifying agent gives preferred results. Further balancing of the hydrophile-lipophile balance is most easily accomplished by varying the length of the fatty chain first reacted with the halohydrin. The reaction of the halohydrin with the fatty acid (to form an ester) or fatty alcohol (to form an ether) is stoichiometric.

The reaction of the protein and the modifying agent is usually carried out for from 1–3 hours at a temperature from 10–100° C. Temperatures of from 50–90° C. are preferred. The aqueous solution of protein may have a pH from 7.5–11, with pH 8–10 preferred.

Products made by the instant method are soluble in both acid and alkaline solutions and are resistant to the action of hard waters. Due to their ready solubility and fluidity, certain of the products are excellent for shampoo and liquid detergents. They may be blended with many fixed alkalis including: tripolyphosphates; hexametaphosphates; tetrapyrophosphates; metasilicates; and carbonates. The extreme buffering effect of the proteinaceous moiety prevents harshness or causticity. Further, the molecular size contributes built-in colloidal as well as soil suspending properties.

Examples of the invention follow:

Example I 200 gms. of lauric acid (1 mole) was mixed with 93 gms. epichlorohydrin (1 mole) and refluxed in the presence of 5 gms. of triethylamine until reflux had almost ceased, but, the temperature within the liquid was 130° C. Reduced pressure was applied and any excess epichlorohydrin and amine was distilled over. The residue was the lauric ester of glycerol monochlorohydrin containing less than 1% free lauric acid and showing a chlorine content of 12.05%.

100 gms. of gelatin was dissolved in 900 gms. of water by soaking cold and finally warming to 65° C. 2 gms. of caustic soda dissolved in 20 cc. water was added slowly to adjust the pH to approximately 8.5–9.0. Wi h efficient stirring, but not whipping air, there was added 13.5 gms. of the lauroyl ester of glycerol monochlorohydrin at 65° C. pH slowly fell and was maintained at 8.0 by the gradual addition of 6 N caustic soda.

After the reaction was complete (1 hr.) the product was found to produce sable emulsions with many fats, oils and waxes without copious amounts of foam.

Example II (A) 100 gms. gelatin in 400 gms. water was soaked until swollen. It was then heated to form a viscous solution to which was added 8 gms. caustic soda dissolved in 25 cc. water. The solution was heated on a steam bath at 95° C. for 5 hrs. at which time the viscosity had fallen appreciably. To this hydrolyzate was added 58 gms. of lauroyl ester of glycerol monochlorohydrin prepared in Example I. The pH which was 9.5 after hydrolysis fell to 7.6 after 1 hour of reaction with the lauroyl ester. The product in this case was hygroscopic and extremely soluble in water forming copious suds. This material was particularly suited for shampoo preparations because of its fluidity, and sudsing properties.

(B) The procedure of A above was followed except that 123 gms. of the lauroyl ester of glycerol monobromohydrin was reacted with the hydrolyzate. The product was very hygroscopic and dissolved readily in water to produce heavy suds.

Example III

The talloyl ester of glycerol monochlorohydrin was prepared by reacting 270 gms. of tallow fatty acids with 100 gms. epichlorohydrin at 120° C. with 1 gm. of tetramethyl ammonium bromide as a catalyst. After 2 hours reflux ceased and the temperature of the reaction mixture had risen to 150° C.

Tank water drawn from the wet rendering of lard was settled to remove all fat possible. The clear water solution of protein after filtering was concentrated to 40% solids and brought to pH of 9.4 with caustic soda. 400 gms. of this "stick" containing 200 gms. of protein hydrolyzate was mixed with 70 gms. of the talloyl ester of glycerol monochlorohydrin and reacted with stirring at 70° C. for two hours. The final reaction mixture was dried in a hot roll producing flakes of surfactant appearing quite like soap flakes. This material exhibited excellent detergency without excessive suds formation.

Example IV 200 gms. of extracted soybean flakes was agitated in 600 gms. water containing 20 gms. caustic soda. The solution was heated under pressure for 2 hrs. at 150° C. After flashing off steam there remained a 40% solid solution of hydrolyzed soya protein along with some carbohydrate material. The product was filtered to remove insoluble fiber and then reacted with 120 gms. of a 1 to 1 mixture of the fatty esters of glycerol monochlorohydrin as prepared in Examples I and III. After 2 hrs. at 80° C. the heavy product was blended with a mixture of detergent phosphate salts and dried to a washing powder having excellent detergent properties.

Example V

The procedure of Example I was duplicated except that 186 gms. of lauryl alcohol was reacted with the epichlorohydrin. 12.9 gms. of the resulting lauryl ether of the chlorohydrin was then reacted with the gelatin. The resulting product exhibited properties similar to the product of Example I.

Example VI 268 gms. of oleyl alcohol was mixed with 93 gms. of epichlorohydrin and refluxed in the presence of 5 gms. of triethylamine until reflux had almost ceased. The liquid temperature was 130° C. Reduced pressure was applied and the excess epichlorohydrin and amine was distilled over. The residue is the oleyl ether of glycerol chlorohydrin. Then 16.6 gms. of this ether was reacted with a gelatin solution prepared as in Example I and containing 100 gms. of gelatin. The resulting product was a liquid which formed a stable emulsion with water and many fats, oils and waxes without excessive foaming.

Obviously many modifications and variations of the invention as hereinbefore set forth may be made without departing from the spirit and scope thereof, and therefore only such limitations should be imposed as are indicated in the appended claims.

We claim:

1. A method for producing proteinaceous surface-active agents comprising: reacting (a) the reaction product of a fatty material and a halogenated epoxy compound, said fatty material selected from the group consisting of fatty acids and fatty alcohols containing 8 to 22 carbon atoms, and said halogenated epoxy compound having the formula

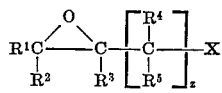

wherein X is a halogen, $R^1$, $R^2$, $R^3$, $R^4$, and $R^5$ are selected from the group consisting of hydrogen and alkyl radicals of 1 to 10 carbon atoms, and z is an integer from 1–10 with (b) an alkaline aqueous solution of hydrolyzed proteinaceous material whereby to condense said reaction prdouct and said proteinaceous material having a molecular weight from about 500 to about 5000.

2. The method of claim 1 wherein said halogenated epoxy compound is epihalohydrin.

3. The method of claim 1 wherein the aqueous solution of proteinaceous material has a pH from 7.5 to 11.0, and the temperature of the reactants is maintained in the range of 10° C. to 100° C.

4. The method of claim 3 wherein said fatty material is a fatty acid and said halogenated epoxy compound is epichlorohydrin.

5. The composition of claim 8 wherein the hydrolyzed protein is from 8 to 10 times the molecular weight of the modifying radical.

6. A proteinaceous surface-active agent prepared by reacting a hyrolyzed proteinaceous material having a molecular weight of from about 500 to about 5000 with a modifying radical selected from the group consisting of fatty esters, fatty ethers and mixtures thereof.

7. The composition of claim 6 wherein the modifying agent is a fatty ether characterized by the structures

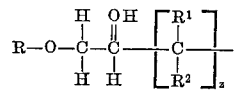

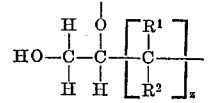

and

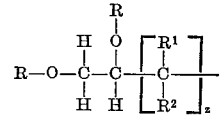

wherein R—O— is a fatty radical of 8–22 carbon atoms, $R^1$ and $R^2$ are selected from the group consisting of hydrogen and alkyl radicals of 1–8 carbon atoms, and z is an integer from 1 to 10.

8. The composition of claim 6 wherein the modifying radical is a fatty ester characterized by the structures.

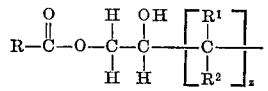

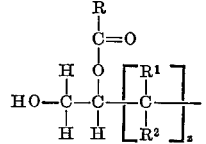

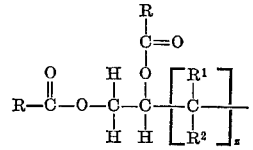

wherein

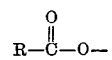

is a fatty radical of 8–22 carbon atoms, $R^1$ and $R^2$ are selected from the group consisting of hydrogen and alkyl radicals of 1–8 carbon atoms, and z is an integer from 1 to 10.

References Cited

UNITED STATES PATENTS

| | | | |
|---|---|---|---|
| 2,780,608 | 2/1957 | Hurwitz et al. | 260—29.6 |
| 2,829,943 | 4/1958 | Filachione et al. | 8—94.33 |
| 2,829,071 | 4/1958 | Schroeder | 117—135.5 |
| 2,882,250 | 4/1959 | Baker | 260—6 |

WILLIAM H. SHORT, *Primary Examiner.*

H. SCHAIN, *Assistant Examiner.*

UNITED STATES PATENT OFFICE
CERTIFICATE OF CORRECTION

Patent No. 3,394,119                                  July 23, 1968

Stewart B. Luce et al.

It is certified that error appears in the above identified patent and that said Letters Patent are hereby corrected as shown below:

Column 2, lines 62 to 65, the structure should appear as shown below:

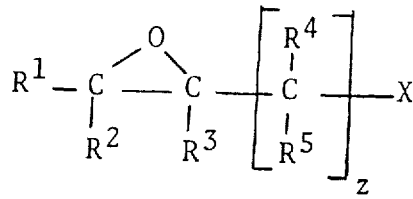

Column 4, line 19, "gms," should read -- gms. --; line 29, "Wi h" should read -- With --; line 35, "sable" should read -- stable --. Column 5, line 56, after "material" insert -- having a molecular weight from about 500 to about 5000 --; line 57, "prdouct" should read -- product --; lines 57 and 58, cancel "having a molecular weight from about 500 to about 5000". Column 6, lines 11 to 14, the structure should appear as shown below:

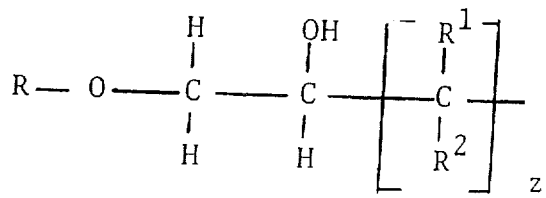

Signed and sealed this 6th day of January 1970.

(SEAL)
Attest:

EDWARD M. FLETCHER, JR.
Attesting Officer

WILLIAM E. SCHUYLER, JR.
Commissioner of Patents